United States Patent
Holloman

(10) Patent No.: US 7,750,236 B2
(45) Date of Patent: Jul. 6, 2010

(54) NON-BORING SUPPORT SYSTEM FOR TRANSMISSION LINE STRUCTURES

(75) Inventor: William A. Holloman, Temple, GA (US)

(73) Assignee: The Southern Company, Atlanta, GA (US)

( * ) Notice: Subject to any disclaimer, the term of this patent is extended or adjusted under 35 U.S.C. 154(b) by 394 days.

(21) Appl. No.: 11/971,350

(22) Filed: Jan. 9, 2008

(65) Prior Publication Data

US 2008/0164061 A1 Jul. 10, 2008

Related U.S. Application Data

(60) Provisional application No. 60/884,027, filed on Jan. 9, 2007.

(51) Int. Cl.
*H02G 7/05* (2006.01)
(52) U.S. Cl. ............... 174/40 R; 174/45 R; 174/128.1; 174/128.2; 156/184
(58) Field of Classification Search ............... 174/40 R, 174/45 R, 128.1, 128.2; 156/184
See application file for complete search history.

(56) References Cited

U.S. PATENT DOCUMENTS

| | | | |
|---|---|---|---|
| 1,940,162 A | 12/1933 | Bodendieck | |
| 3,922,476 A | 11/1975 | Clutter et al. | |
| 4,695,039 A | 9/1987 | Clossen | |
| 4,721,213 A | 1/1988 | Eitel | |
| 5,009,734 A * | 4/1991 | Therond | 156/184 |
| 5,377,402 A | 1/1995 | Semple, Jr. | |
| 6,512,442 B1 | 1/2003 | Taylor | |

FOREIGN PATENT DOCUMENTS

| | | |
|---|---|---|
| JP | 10056726 | 2/1998 |
| JP | 2005198459 | 7/2005 |

* cited by examiner

*Primary Examiner*—Dhiru R Patel
(74) *Attorney, Agent, or Firm*—Seyed Kaveh E. Rashidi-Yazd, Esq.; Ryan A. Schneider, Esq.; Troutman Sanders LLP

(57) ABSTRACT

A support system for transmission lines includes a base plate, a securing assembly, and a supporting arm. The base plate is secured to the transmission line pole with the securing assembly. The supporting arm can include an insulating apparatus; the insulator apparatus of the supporting arm is adapted to provide a safe dielectric distance from the transmission power line and the transmission line structure, e.g., power pole. A first end of the supporting arm is carried by a mounting member and is connected to the transmission line pole via the base plate, while the second end can receive a conductor with a connector. The connector is adapted to secure a conductor, and is positioned at the second end of the insulator apparatus.

18 Claims, 5 Drawing Sheets

NON-BORING SUPPORT SYSTEM FOR TRANSMISSION LINE STRUCTURES

CROSS REFERENCE TO RELATED APPLICATION

This application claims benefit, under 35 U.S.C. §119(e), of U.S. Provisional Application Ser. No. 60/884,027, filed 9 Jan. 2007, the entire contents and substance of which is hereby incorporated by reference.

BACKGROUND

1. Field of the Invention

The present invention relates to power transmission structures and, more particularly, to a support system for at least temporarily attaching a transmission line to a transmission line structure, such as a transmission power pole.

2. Description of Related Art

Transmission power lines are wires or conductors through which high voltage electric power is moved from point to point. Transmission power lines, or conductors, are fastened to large transmission line structures, such as transmission power poles. For safety reasons, this fastening typically occurs well above the ground.

It is often desirable to temporarily install transmission power lines to a transmission line structure. For example, this temporary installation occurs when a utility company is reconductoring, i.e., inserting new, and typically larger, transmission power lines to a given area, while the conductors are live. Further, this temporary installation occurs when one or more conductors recently have fallen, and rather than permanently reattaching the conductors to the structures, the conductors are placed on a temporary support structure until the proper manpower can be arranged to complete the permanent installation.

Conventionally, in order to provide a temporary support for a transmission power lines, a hole must be bored into the transmission line structure. For instance, FIG. 1 illustrates a conventional assembly, system, and method of securing and mounting a transmission power line to a transmission line structure.

The conventional assembly 100 includes a transmission line structure 110, a securing mechanism 120, a supporting arm 130, and a transmission power line 140. The assembly 100 can be either permanently or temporarily connected to the transmission line structure 110. The supporting arm 130 includes a number of insulators 132 to insulate the transmission line structure from the transmission power line 140.

The securing mechanism 120 is securable to the transmission line structure 110. The supporting arm 130 has a first end and a second end. The first end of the supporting arm 130 is connected to the securing mechanism 120, and the second end carries the transmission power line 140.

In order for the assembly 100 to be connected to the transmission line structure 110, a hole 112 must be bored into the transmission line structure 110. Further, a hole 122 must be bored into the supporting arm 130.

At least one fastening member 114, such as a bolt, pin, or like device, can be inserted through the aperture 112 in the securing mechanism 120. Also, at least one fastening member 114 is inserted into the hole 122 defined in the supporting arm 130 and the securing mechanism 120, whereupon the supporting arm 130 is secured to the transmission line structure 110 via the securing mechanism 120. Oftentimes, more than one hole in the supporting arm 130 and more than one hole in the transmission line structure 110 must be bored to properly and effectively secure the supporting arm 130 to the transmission line structure 110.

After removing the supporting arm 130 from the transmission line structure 110, utility companies are typically left with a number of bored holes in the supporting arm 130 and the transmission line structure 110. Thus, after a few times of securing the same supporting arm 130 to one or more transmission line structures, the supporting arm 130 can not be used again. Moreover, eventually the transmission line structure 110 must be replaced, which requires significant manpower, is time-consuming, may require power downtime, and is costly.

What is needed, therefore, is a non-boring support system for supporting a transmission power line. It is to such a device, method, and system that the present invention is primarily detected.

SUMMARY

Briefly described, in preferred form, a support system for securing lines, wires, and/or conductors a desired distance above the ground is a non-boring support system. In a preferred embodiment, the present invention is a support system for temporarily supporting/holding power lines aloft with a power line structure. The support system can temporarily support a transmission line above the ground with a transmission line structure, for example and not limitation, a power pole.

The support system of the present invention comprises a base plate, a securing assembly, and a supporting arm. The base plate is secured to the transmission line pole via the securing assembly. The supporting arm can include an insulating apparatus, which is adapted to provide a safe dielectric distance from the transmission power line and the transmission line structure, e.g., power pole. A first end of the supporting arm is carried by a mounting member and is connectable to the transmission line pole via the base plate, while the second end can receive a conductor with a connector. The connector is adapted to carry at least one conductor, and is positioned at the second end of the insulator apparatus.

In one aspect, the support system can temporarily support at least one transmission power line with a transmission line structure via a non-boring system. The non-boring support system comprises the base plate, the supporting arm, and at least one non-boring securing assembly. The base plate has first and second sides, and the first side can receive a portion of the perimeter of the transmission line structure. The supporting arm extends from the base plate and supports the transmission power line. Specifically, a first end of the supporting arm extends outwardly from the second side of the base plate, while a second end of the supporting arm is in communication with transmission power line. The at least one non-boring securing assembly secures the base plate to the transmission line structure, wherein it wraps around a portion of the transmission line structure and is preferably coupled to the base plate.

In another aspect, the present invention is an improved method of supporting the transmission power line with the transmission line structure, preferably a power pole. Conventional methods of supporting the transmission power line with the transmission line structure include a number of steps. Notably, these steps require the boring of a hole in the transmission line structure and support arm holding the transmission power line. For example, the conventional method includes (i) boring a hole into the transmission line structure, (ii) connecting a securing member to the transmission line structure by inserting an elongated fastening member through an aperture of the securing member and into the bored hole of the transmission line structure, (iii) coupling a supporting arm to the securing member at a first end of the supporting arm, and (iv) securing a conductor to a second end of the supporting arm. An improved method provides a base plate removeably attached to the transmission line structure; and secures the base plate to the transmission line structure with a non-boring securing assembly about the perimeter of the transmission line structure.

These and other objects, features and advantages of the present invention will become more apparent upon reading the following specification in conjunction with the accompanying drawing figures.

DETAILED DESCRIPTION

To facilitate an understanding of the principles and features of the invention, it is explained hereinafter with reference to its implementation in an illustrative embodiment. In particular, the invention is described in the context of being a non-boring support system for temporarily supporting/holding transmission power lines aloft with a transmission line structure. Furthermore, the invention is also described in the context of a non-boring support system for securing a supporting arm to hold aloft at least one transmission power line via the transmission line structure.

The invention, however, is not limited to its use as a non-boring support system for supporting transmission power lines or for securing a supporting arm. Rather, the invention can be used when a device for temporarily supporting various utilities aloft is desired, or as is necessary. Thus, the device, system, and method described hereinafter as a non-boring support system can also find utility for other applications, beyond that of transmission power systems, for example and not limitation, utilities, distribution power systems, telecommunication wires, and the like.

In an exemplary embodiment, a support system for transmission power lines includes a base plate, a securing assembly, and a supporting arm. The base plate is secured to the transmission line pole via the securing assembly. The supporting arm can include an insulating apparatus, which is adapted to provide a safe dielectric distance from the transmission power line and the transmission line structure, e.g., power pole. A first end of the supporting arm is carried by a mounting member and is connected to the transmission line pole via the base plate, while the second end can receive a conductor with a connector. The connector is adapted to secure a conductor, and is positioned at the second end of the insulator apparatus.

The material described hereinafter as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

Figure 2:
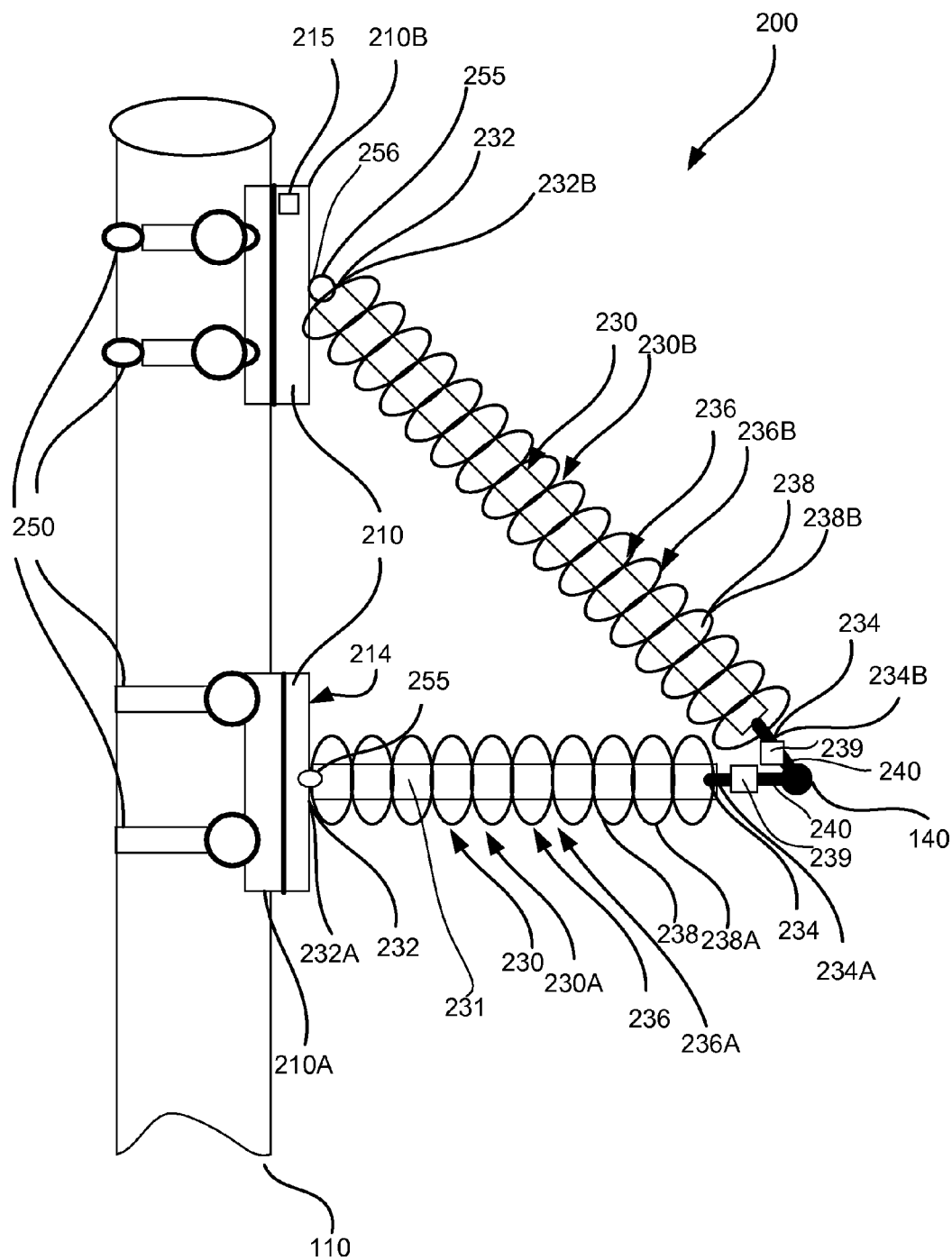
FIG. 2 is a side partial perspective view of a non-boring support system, in accordance with an exemplary embodiment of the present invention.

Referring now to the figures, wherein like reference numerals represent like parts throughout the view, the present invention will be described in detail. The present invention comprises a non-boring support system. FIG. 2 illustrates an exemplary non-boring support system, in accordance with a preferred embodiment of the present invention.

The non-boring support system 200 is adapted to temporarily support at least one transmission power line 140 upon a transmission line structure 110. The non-boring support system 200 comprises at least a base plate 210, a supporting arm 230, and a securing assembly 250. The base plate 210 includes a first side 212 and a second side 214. The first side 212 of the base plate 210 is adapted to receive a portion of the perimeter of the transmission line structure 110, for example a transmission power pole. For instance, the first side 212 is in communication with the power pole. The supporting arm 230 is adapted to support the transmission power line 140. A first end 232 of the supporting arm 230 extends outwardly from the second side 214 of the base plate 210. A second end 234 of the supporting arm 230 is in communication with the transmission power line 140 be to be held aloft. The securing assembly 250 is adapted to secure the base plate 210 to the transmission line structure 110, and is preferably wrapped around a portion of the transmission line structure 110. In a preferred embodiment, the securing assembly 250 is a non-boring securing assembly, such that there is no boring required for supporting the transmission power line 140 via the transmission line structure 110.

In a preferred embodiment, the base plate 210 is secured to the transmission line structure 110, such as a power pole, via one or more non-boring securing assemblies 250, for example and not limitation straps, bands, or chains. Because the base plate 210 is releasably securable to the transmission line structure 110 with the non-boring securing assembly 250, the integrity of the transmission line structure 110 is not compromised with bores and can lengthen the life of same. The base plate 210 carries the supporting arm 230, which, in turn, carries the transmission power line 140. The supporting arm 230 can extend from the base plate 210, which is coupled to the transmission line structure 110, and can support the transmission power line 140. Preferably, the supporting arm 230 includes an insulator string 236, which comprises a plurality of insulators 238, to effectively insulate the transmission line structure 110 from the transmission power line 140.

In various aspects of the present invention, the non-boring support system 200 can carry varying sized conductors, or transmission power lines 140, and be coupled to varying types of transmission line structures 110. There are many different types and sized conductors that carry energy for transmission power lines. Typically, conductor-sizes are identified in the amount of voltage being transmitted; for example, the most common transmission voltages in use are 765, 500, 400, 220 kV. Voltages below 69 kV are often referred to as sub-transmission or distribution voltages. There are varying types of transmission line structures, and they are composed of varying materials. For example and not limitation, transmission line structures can include transmission power poles. Power poles can be made of metal, concrete, fiberglass, wood, and the like. Further, power poles can have varying shapes such as lattice-type, truss-type, or the conventional elongated, cylindrically-oriented pole.

The non-boring support system 200 includes the base plate 210. The base plate 210 is a support plate implemented to be securable to the transmission line structure 110. The base plate includes the first side 212 and the second side 214. The first side 212 is adapted to receive a portion of the perimeter of the transmission line structure 110. The base plate 210 is essentially the connection point for the supporting arm 230, such that the supporting arm 230 can be secured to the transmission line structure 110.

Figure 3A:
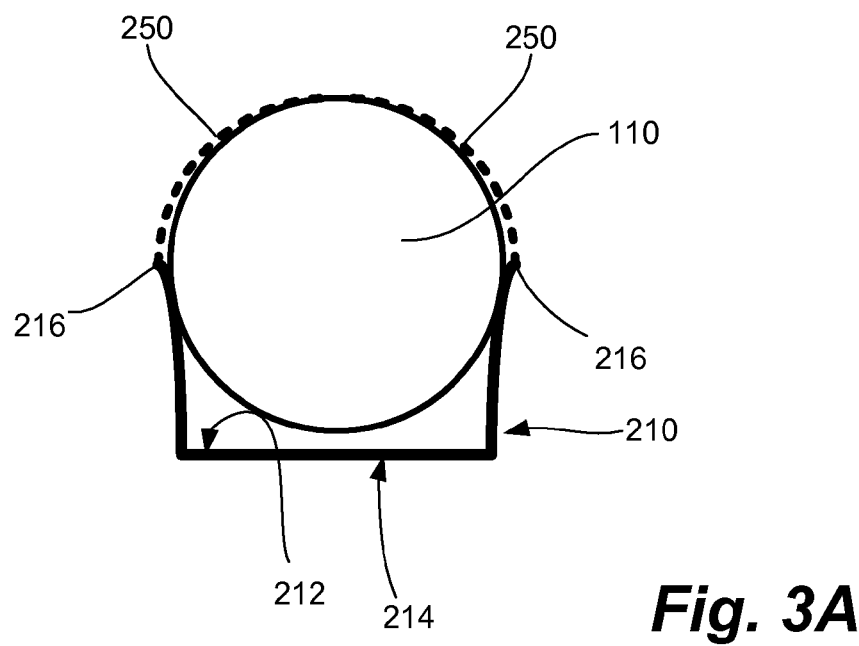
FIGS. 3A-3B are top, cross-sectional views of a base plate of the non-boring support system, in accordance with exemplary embodiments of the present invention.
Figure 3B:
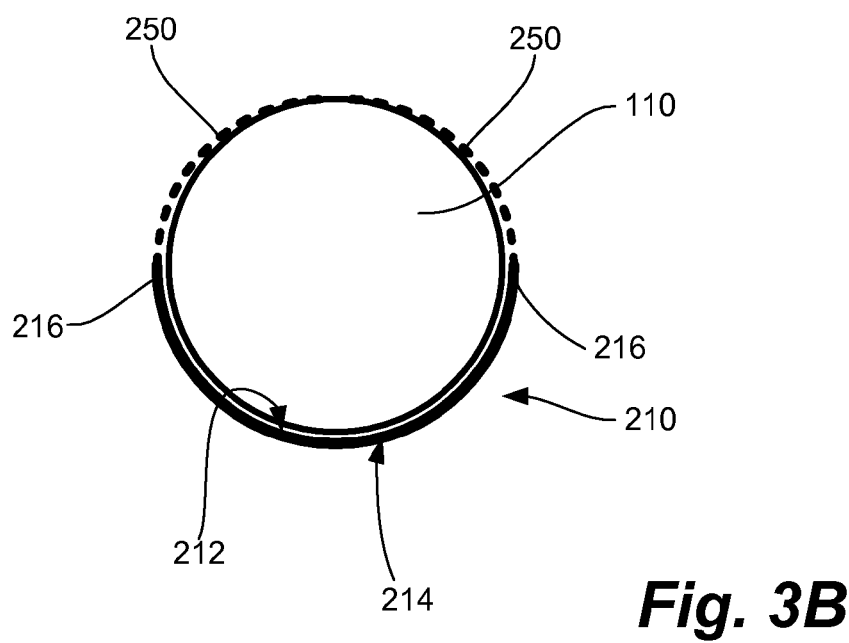

As illustrated in FIGS. 3A and 3B, the base plate 210 can have a number of shapes for receiving a portion of the structure 110. Preferably, a portion of an edge 216 of the base plate 210 is in contact with the structure 110 for optimal security of the base plate to the structure 110. For instance, as shown in FIG. 3A, the base plate 210 includes at least two opposing edges 216 that are in contact with the perimeter of the structure 110. Attached to each edge of the base plate 210 can be the securing assembly 250. Also, as shown in FIG. 3B, the base plate can have an arcuate shape, such that the majority of the structure 110 is in juxtaposition or in contact with the base plate 210. Preferably, attached to each edge 216 of the base plate 210 can be the securing assembly 250. One skilled in the art would appreciate that the base plate 210 can have a number of shapes that are adapted to receive a portion of the transmission line support 110 and still stabilize the supporting arm 230.

Further, the base plate 210 can envelope the supporting arm 230 to be secured to the transmission line pole 110, wherein not requiring boring a hole into the supporting arm 230 to safely secure the supporting arm 230 to the transmission line pole 110. The base plate 210 can comprise a housing defining a channel or pathway sufficiently large enough to receive and secure the supporting arm 230.

Referring back to FIG. 2, the non-boring support system 200 further includes at least one supporting arm 230. The supporting arm 230 is adapted to support the transmission power line 140. The first end 232 of the supporting arm 230 extends outwardly from the second side 214 of the base plate 210, while the second end 234 of the supporting arm 230 is in communication with the transmission power line 140 be to be held aloft. A mounting member 255 can be connected at the first end 232 of the supporting arm 230 to mount the supporting arm 230 to the base plate 210. A connector 240 can be connected at the second end of the supporting arm 230 to enable it to securely hold the conductor 140.

In one embodiment, the supporting arm 230 is preferably an insulator string 236. The insulator string 236 preferably includes a plurality of insulators 238 to provide a safe dielectric distance of the transmission power line 140 from the transmission line structure 110. Commonly, insulators 238 are made of a material that does not conduct electricity, such as glass, ceramic, porcelain, or rubber, which resist the flow of electric current. A purpose of the insulators 238 is to reduce, if not prohibit, electricity passing from the conductor 140 to the pole 110, and is intended to support/separate electrical conductors without passing current therethrough. Because the transmission power pole 110 may be made of conductive material, e.g., metal, the insulator 238 must be positioned between the conductor 140, which is carrying the electricity, and the power pole 110. Otherwise, the power pole 110 could become conductive, such that the pole 110, itself, is powered with the electricity, which would be dangerous and hence is not desirable.

In an exemplary embodiment, there can be a single supporting arm 230A extending generally parallel with the ground surface; in other words, the single supporting arm 230A can be positioned in a generally horizontal-orientation. This is often referred to as a line post brace. In this orientation, the first end 232A of the supporting arm 230A is secured to the second side 214A of the base plate 210A. The second end 234A of the supporting arm 230A carries the connector 240A, which holds the conductor 140. A single supporting arm 230A may be used when the conductor 140 is rather lightweight.

There can be more than one supporting arm 230 for supporting the conductor 140. For instance, if a single supporting arm 230A is not capable of securing the conductor 140 aloft more than one supporting arm 230 can be implemented. In such an embodiment, the first supporting arm 230A can be implemented in the horizontal-orientation, as described above. For additional stability, a second supporting arm 230B can be also implemented in the non-boring support system 200. This second supporting arm orientation is often referred to as an I-string insulator. The second supporting arm 230B has first and second ends like the first supporting arm 230A, which terminate at a base plate 210—at the mounting member 255—and a connector 240, respectively. Preferably, the position of the second supporting arm 230B is essentially a hypotenuse of a right triangle, such that the structure 110 and the first supporting arm 230A compose the bases of the right triangle. In other words, the angle between the connectors for the two supporting arms 230A and 230B is acute, or less than 90 degrees. In addition, the two arm arrangement can be designed to secure the supporting arm 230B at an angle ranging from approximately thirty to one-hundred and fifty degrees in relating to the transmission line pole 110.

Preferably, if a two supporting arm arrangement is implemented, the connection between the first ends of the supporting arms 230A and 230B are slightly different. Hence, the base plates 210A and 210B for the first and second supporting arms 230A and 230B, respectively, can be slightly different. For instance, an exemplary connection between the first end 232A of the first supporting arm 230A and the base plate 210A is illustrated in FIG. 4.

Figure 4:
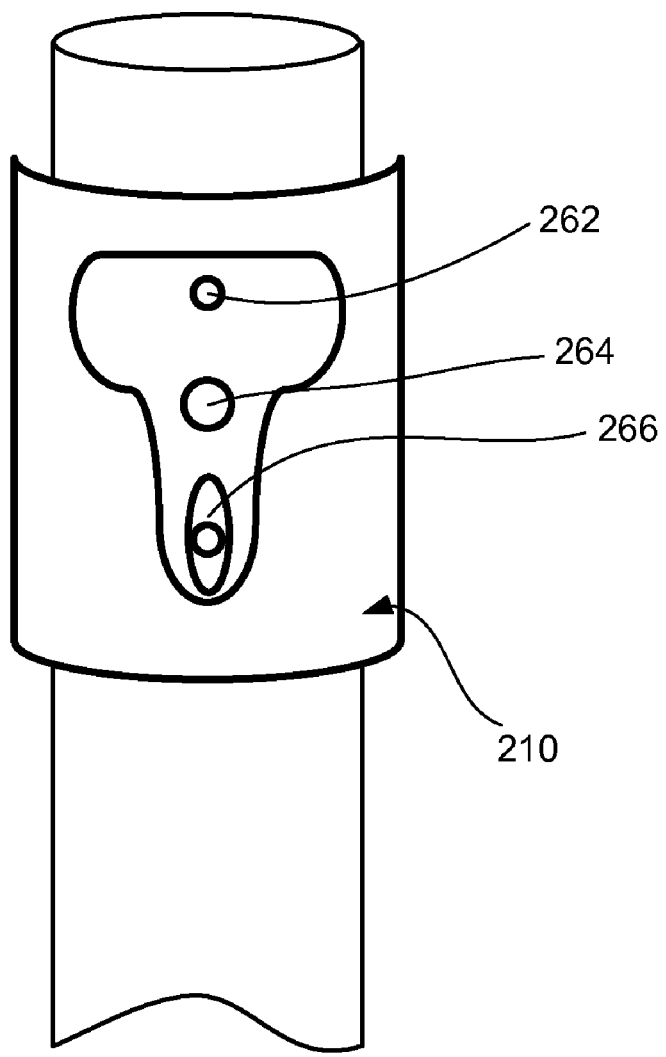
FIG. 4 is a front view of the base plate of the non-boring support system, in accordance with an exemplary embodiment of the present invention.

As shown in FIG. 4, the base plate 210A can include a top aperture 262, a middle aperture 264, and a bottom slot 266 sufficiently sized to receive a pin. The top aperture 262 of the base plate 210A is adapted to receive a fastening member from the supporting arm 230 to secure the supporting arm 230A to the base plate 210A. An arm 231 of the supporting arm 230 can be received by the middle aperture 264 of the base plate 210A. The arm 231, in an effort to lighten the load, can be manufactured having a portion of the center being hollow. A pin extending from the first side 232A of the supporting arm 230A can be inserted into the bottom slot 266. Because insulator string manufacturers place these pins at different locations, i.e., different distances from the arm 231, the slot 266 is used, rather than an aperture, because the slot 266 can receive pins placed at different positions.

As shown in FIG. 2, for the second supporting arm 230B, a trunyon or eye bolt 256 can extend from the base plate 210, and can be implemented as the mounting member 255 on the base plate 210B for securing the supporting arm 230B thereto.

Figure 5:
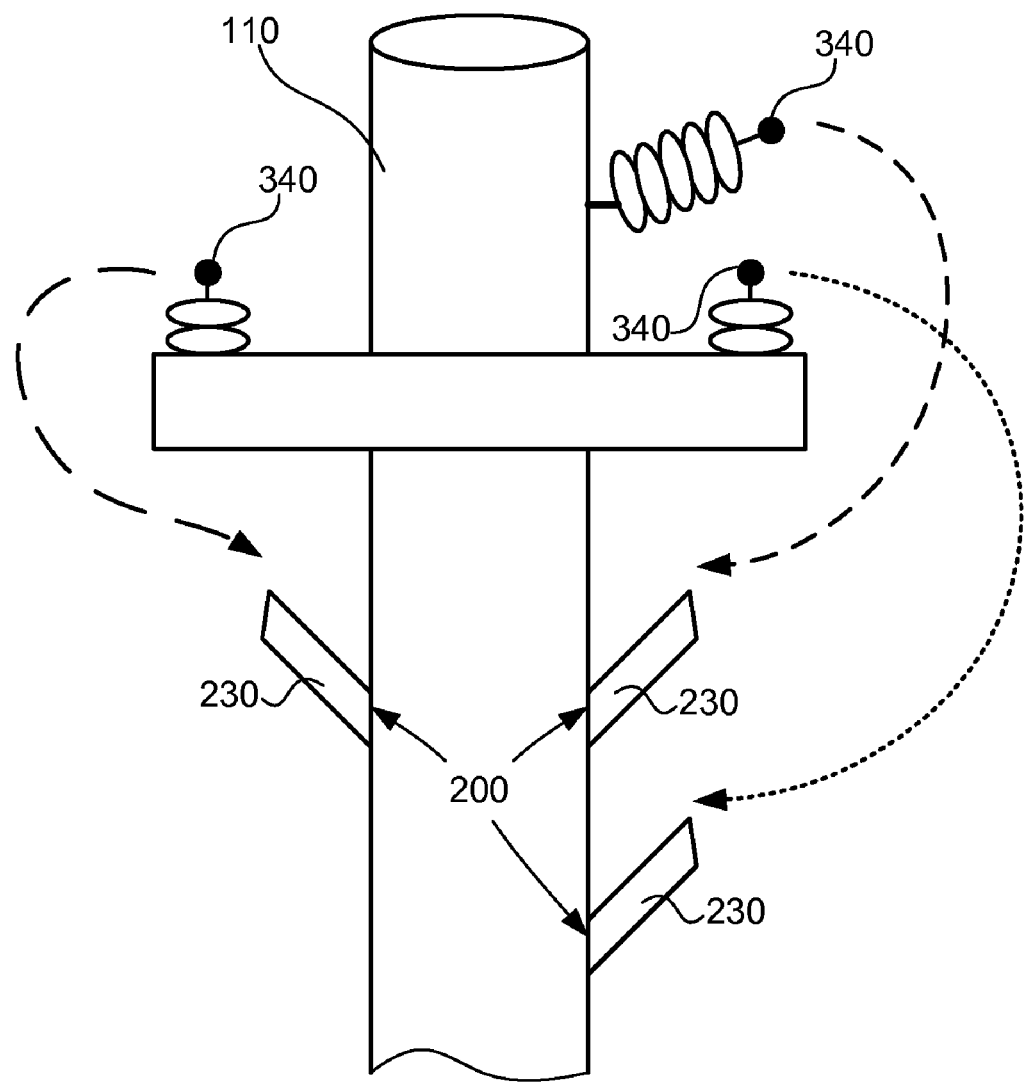
FIG. 5 is a side partial perspective view of an exemplary use of the non-boring support system, in accordance with an exemplary embodiment of the present invention.

The supporting arm 230 is adapted to be, preferably, temporarily attached to a transmission line pole 110 to aid linemen in the transfer of lines in an upgrade, for example, reconductoring. An exemplary illustration of reconductoring is shown in FIG. 5. Reconductoring refers to a method of upgrading conductors in a distribution or transmission electrical system. For example, a residential area receiving a load can increase in population. As a result of this increase in population, an electric utility company must provide more electricity to a given area. Commonly, this is accomplished by providing larger conductor size (typically, a conductor having a larger diameter is installed).

In an effort to ease the responsibility of linemen, a temporary supporting arm 230 can be attached to a transmission line pole 110. This supporting arm 230 can assist with moving the old conductors (smaller diameter conductors) out of the way and to pull new conductors (larger diameter conductors) to attach to the transmission line pole 110. This transition assists the linemen with the changing of conductors and eases the overall process. Other utility companies can use the reconductoring process to provide new, larger, and/or improved lines to their customers.

Referring back to FIG. 2, the non-boring support system 200 also includes the securing assembly 250. The securing assembly 250 is preferably wrapped around a portion of the transmission line structure 110 for securing the base plate to the structure 110. Moreover, the securing assembly 250 can be coupled around the transmission line structure 110.

In a preferred embodiment, the securing assembly 250 is a non-boring securing assembly, such that there is no boring required for supporting the transmission power line 140 via the transmission line structure 110. The edges 216 of the base plate 210 can receive and secure the securing assembly 250.

Each base plate 210 in the non-boring support system 200 can have at least one securing assembly 250 for securing to the structure 110. As shown in FIG. 2, each base plate 210 can have two securing assemblies 250. Each securing assembly 250 is a non-boring securing assembly, such that to secure the base plate 210 to the structure 110 boring is not required.

A preferred non-boring securing assembly is a tensioning strap, such that as the strap is pulled it tightens. An example of a tensioning strap is a ratcheted strap. Other examples of non-boring securing assemblies include: a chain, a chain binder, a band, a nylon strap, a nylon strap band, a strap hoist, and the like.

In one embodiment, the securing assembly 250 is of unitary construction with the base plate 210. Due to potential wear and tear based on ultraviolet rays and harsh weather elements, it is preferable that the securing assembly 250 be replaceable within the non-boring support system 200. Specifically, it is preferable that one can easily and quickly replace the securing assembly 250 enabling the base plate 210 to be reused, as bores are not required.

By implementing a non-boring securing assembly 250, the non-boring support system 200 is reusable, as the conventional bores are not present. The structure 110 is not compromised by bores, and thus prolongs the life of these expensive structures. Further, because the securing assembly 250 is non-boring, it can be moved from one structure to another, as desired or needed.

Figure 1:
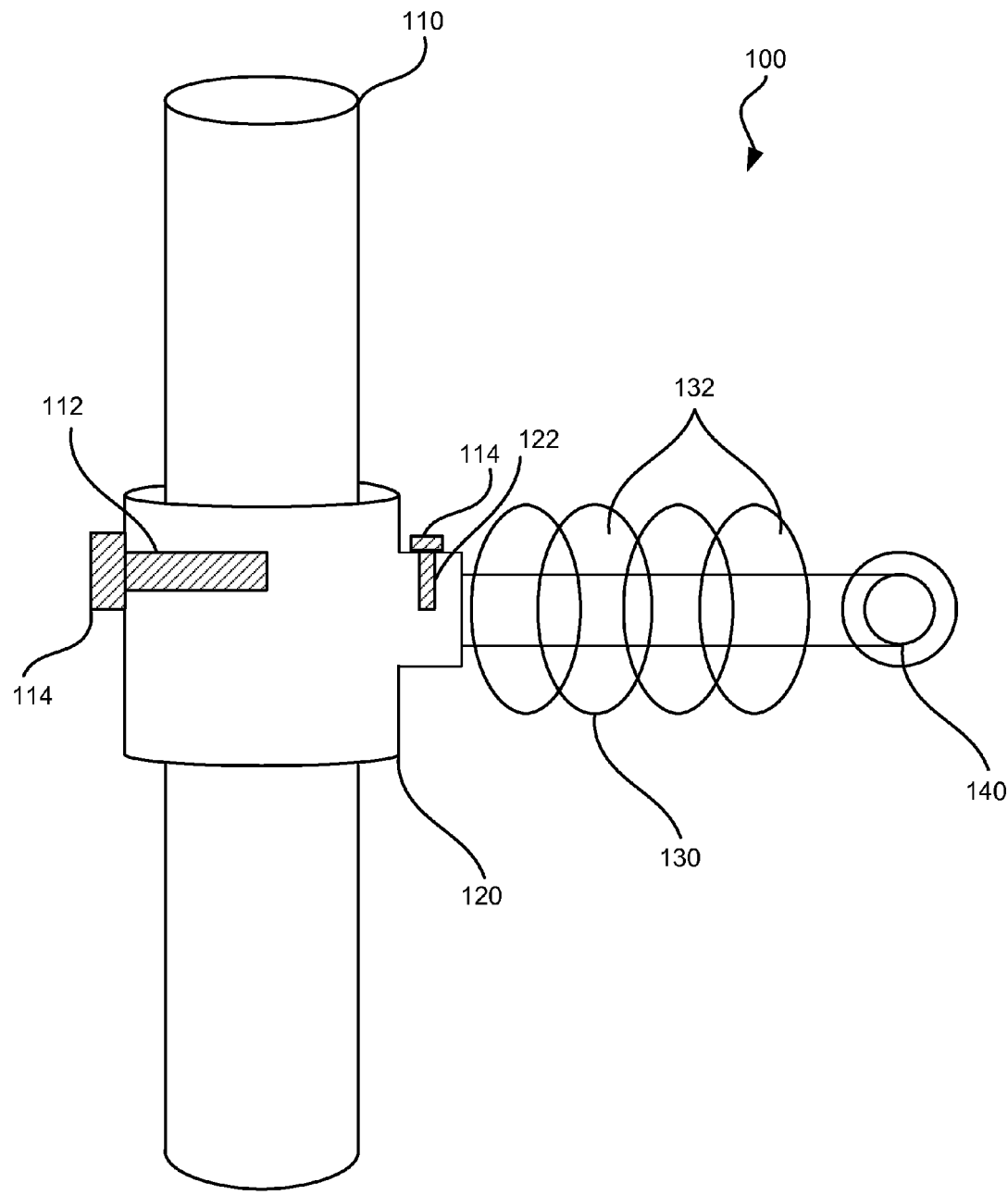
FIG. 1 is a partial, side, perspective view of a conventional transmission line structure carrying a conductor.

In another aspect, a process can releasably connect the supporting arm 230 to a transmission line pole 110. The conventional process of attaching a supporting arm 230 to a transmission line pole 110 includes a boring support system 100 (see FIG. 1).

As described in the Background section, supra, the conventional boring support system 100 includes boring a hole into the transmission line pole 110, boring a hole into the supporting arm 130, and permanently fastening the arm 130 to the transmission line pole 110 via a bored fastening means 114, wherein the integrity of both the transmission line pole 110 and the supporting arm 130 are compromised with bores. Another conventional process of attaching a supporting arm 130 to a transmission line pole 110 includes a metal strap tension system. The metal strap tension system includes cutting a piece of metal strap, wrapping the metal strap around the transmission line pole and a vertical portion of the supporting arm, and tensioning and securing the metal strap. The metal strap tension system creates a large amount of metal strap waste as the tensioned metal straps must be cut to be removed from the transmission line poles and therefore can not be reused.

The improved process of the present invention comprises releasably securing the supporting arm 230 to the transmission line pole 110 via the non-boring support system 200. The non-boring support system 200 is capable of securely attaching the supporting arm 230 and the transmission pole 110 when a load on the arm 230 includes, for example, a transmission line 140. The non-boring support system 200 also permits reusing the material used to secure the supporting arm 230 to the transmission line pole 110. Further, the improved process includes the non-boring support system 200 releasably securing the supporting arm 230 to the transmission line pole 110 for temporarily using the supporting arm 230 during a reconductoring process (see FIG. 5).

The non-boring support system 200 of the improved process can include the base plate 210 that defines a pathway sufficiently-sized to securely house the supporting arm 230 in an approximately normal orientation to the transmission line pole 110; and the securing assembly 250 to releasably secure the base plate 210 to the transmission line pole 110.

The securing assembly 250 can include at least one aperture cooperatively shaped to receive a preexisting bolt of the transmission line pole 110 for mounting the non-boring support system 200 to the transmission line pole 110. The securing assembly 250 can include at least two chain receiving pathways for receiving a chain, wherein the chain wraps around the transmission line pole 110 to secure the non-boring support system 200 to the transmission line pole 110, without boring holes therein. A portion, such as the rear side, of the securing assembly 250 can be cooperatively shaped with the transmission line pole for flush fitting with the transmission line pole 110 (see FIGS. 3A-3B).

Moreover, the non-boring support system 200 for supporting the temporary supporting arm 230 for use in a reconductoring process in an approximately normal orientation to the transmission line pole 110 can include the base plate 210 having a housing 255 defining a pathway for receiving the supporting arm 230. The base plate 210 can include a locking device for releasably securing a portion of the supporting arm 230 within the housing 255 of the securing assembly 250. The non-boring support system 200 also includes the securing assembly 250 for releasably securing the base plate having the supporting arm to the transmission line pole.

In the reconductoring example, shown in FIG. 5, the temporary supporting arm 230 holds the existing energized lines 140 out of the way, preferably safely above the ground, while new lines and wiring are installed. In conventional systems, lines were too heavy for wooden cross arms, wherein wooden cross arms were bored to attach to the pole.

The present invention, the support system 200 reduces, if not eliminates, the need of boring holes in the supporting arm 230 and the transmission line poles 110. As a result, the supporting arm 230 can be reused several times with out being structurally degraded and the transmission line poles 110 will be able to remain in service for a longer period of time without the boring of holes for temporary support arms. Furthermore, the support system 200 reduces the amount of waste that is created by using a conventional tensioned metal strap supporting system. The support system 200 is adapted to hold the supporting arm 230 to the transmission line pole 110 in a non-boring assembly.

While the invention has been disclosed in its preferred forms, it will be apparent to those skilled in the art that many modifications, additions, and deletions can be made therein without departing from the spirit and scope of the invention and its equivalents, as set forth in the following claims.

What is claimed is:

1. A non-boring support system for temporarily supporting at least one transmission power line with a transmission line structure, the non-boring support system comprising:
   a base plate adapted to receive a portion of the perimeter of the transmission line structure;
   an arm for supporting the transmission power line, a first end of the arm extending outwardly from a side of the base plate, and a second end of the arm in communication with transmission power line; and
   at least one non-boring securing assembly for securing the base plate to the transmission line structure, the non-boring securing assembly wrapped around a portion of the transmission line structure and coupled to the base plate.

2. The non-boring support system of claim 1, the arm further comprising a connector for securing the transmission power line to the second end of the arm.

3. The non-boring support system of claim 1, the arm further comprising an insulator string for insulating the transmission power line from the transmission line structure.

4. The non-boring support system of claim 3, insulator string comprising a plurality of insulators.

5. The non-boring support system of claim 1, the at least one non-boring securing assembly comprising a securing member coupled to opposing edges of the base plate.

6. The non-boring support system of claim 5, the at least one non-boring securing assembly is from the group consisting of a chain, a chain binder, a band, a nylon strap, a nylon strap band, and a strap hoist.

7. A support system comprising at least two non-boring support systems of claim 1.

8. The support system of claim 7, a first non-boring support system further comprises the arm being positioned approximately horizontal; a second non-boring support system further comprises the arm being positioned at angle with respect to the transmission line structure, and the first and second non-boring support system in combination supporting a single transmission power line.

9. In a support system for supporting a transmission power line with a transmission line structure, the support system including (i) a securing mechanism coupled to the transmission line structure via a bored fastening means, (ii) a supporting arm extending outwardly from the securing mechanism, a first end of the supporting arm coupled to the securing mechanism and a second end of the supporting arm carrying the transmission power line,
   the improvement comprising a securing mechanism in communication with the transmission line structure via a non-boring securing assembly; and a base plate for carrying the supporting arm, the base plate sized to receive a portion of the perimeter of the transmission line structure.

10. The improvement of claim 9, further comprising at least one non-boring securing assembly for securing the base plate to the transmission line structure, the non-boring securing assembly wrapped around a portion of the transmission line structure and coupled to opposing edges of the base plate.

11. A non-boring support system for carrying an apparatus, the non-boring support system comprising:
    a base plate adapted to receive a portion of the perimeter of a support structure;
    a first arm for supporting the apparatus, a first end of the first arm extending outwardly from a first side of the base plate, and a second end of the first arm in communication with the apparatus; and
    at least one non-boring securing assembly for securing the base plate to the support structure, the non-boring securing assembly wrapped around a portion of the support structure and coupled to the base plate.

12. The non-boring support system of claim 11, wherein a second side of the base plate receives the portion of the perimeter of the support structure.

13. The non-boring support system of claim 11, the apparatus comprising a utility line.

14. The non-boring support system of claim 11, the support structure having a substantially vertical orientation.

15. The non-boring support system of claim 11, the first arm having a substantially horizontal orientation.

16. The non-boring support system of claim 11, further comprising a second arm for further supporting and carrying the apparatus.

17. The non-boring support system of claim 11, further comprising:
    a second base plate adapted to receive a portion of the perimeter of the support structure; and
    a second arm for further supporting the apparatus, a first end of the second arm extending outwardly from a first side of the second plate, and a second end of the second arm in communication with the apparatus.

18. The non-boring support system of claim 17, wherein the apparatus comprises a utility line adapted to provide a utility; wherein the support structure has a substantially vertical orientation and the first arm has a substantially horizontal orientation; and wherein the second base plate is positioned above the first base plate.

* * * * *